United States Patent
Trottier et al.

(10) Patent No.: US 6,903,706 B1
(45) Date of Patent: Jun. 7, 2005

(54) METHOD AND APPARATUS FOR MULTI-DISPLAY OF DIGITAL VISUAL INTERFACES

(75) Inventors: Lorne Trottier, Beaconsfield (CA); Yves Tremblay, Pointe-Claire (CA); Razid Samdjy, Montreal (CA); Robert Lafleur, Baie d'Urfé (CA); Stéphane Tremblay, St-Joseph-du-Lac (CA)

(73) Assignee: Matrox Graphics Inc., Dorval (CA)

( * ) Notice: Subject to any disclaimer, the term of this patent is extended or adjusted under 35 U.S.C. 154(b) by 302 days.

(21) Appl. No.: 10/101,503

(22) Filed: Mar. 20, 2002

(51) Int. Cl.[7] .............................................. G09G 5/00
(52) U.S. Cl. ................................ 345/1.1; 345/1.3
(58) Field of Search .................... 345/1.1, 1.3, 212, 345/698, 545, 1, 102, 207, 208, 150, 154, 88, 3.1, 211, 217, 147, 543, 903; 375/295, 260, 316; 348/231.99; 349/106; 356/244; 359/618; 342/26; 370/521; 713/189; 358/22; 725/74

(56) References Cited

U.S. PATENT DOCUMENTS

| | | | |
|---|---|---|---|
| 5,402,148 A | * | 3/1995 | Post et al. ................... 345/698 |
| 5,517,193 A | * | 5/1996 | Allison et al. ................ 342/26 |
| 5,805,117 A | * | 9/1998 | Mazurek et al. ............. 345/1.3 |
| 6,101,038 A | * | 8/2000 | Hebert et al. ................ 359/618 |
| 6,195,797 B1 | * | 2/2001 | Williams, Jr. ................ 725/74 |
| 6,498,642 B1 | * | 12/2002 | Duckett ....................... 356/244 |
| 6,577,303 B2 | * | 6/2003 | Kim ............................ 345/212 |
| 6,611,241 B1 | * | 8/2003 | Firester et al. ............... 345/1.3 |
| 2001/0055081 A1 | * | 12/2001 | Shigeta ....................... 349/106 |
| 2003/0043158 A1 | * | 3/2003 | Wasserman et al. ........ 345/545 |
| 2003/0058355 A1 | * | 3/2003 | Wong et al. ........... 348/231.99 |
| 2003/0086503 A1 | * | 5/2003 | Rennert et al. ............. 375/260 |
| 2003/0112828 A1 | * | 6/2003 | Nio et al. .................... 370/521 |
| 2003/0152160 A1 | * | 8/2003 | Bauch et al. ................ 375/295 |
| 2003/0169831 A1 | * | 9/2003 | Neugebauer et al. ....... 375/316 |
| 2004/0039927 A1 | * | 2/2004 | Hazama et al. ............. 713/189 |

OTHER PUBLICATIONS

Digital Visual Interface DVI, Apr. 2, 1999, Silicon Image, Inc., USA. and Molex Inc., USA. pp. 1 to 76.

* cited by examiner

*Primary Examiner*—Vijay Shankar
*Assistant Examiner*—Prabodh M Dharia
(74) *Attorney, Agent, or Firm*—Alexandra Daoud; Ogilvy Renault

(57) ABSTRACT

Provides an apparatus and method for displaying dual Digital Visual Interface (DVI) displays simultaneously, with independent images, by using a Transition Minimized Differential Signaling (TMDS) serializer with dual channels and one clock. Also provides an apparatus and method allowing either two low-resolution displays or one high-resolution display to be driven by a reduced circuit.

14 Claims, 10 Drawing Sheets

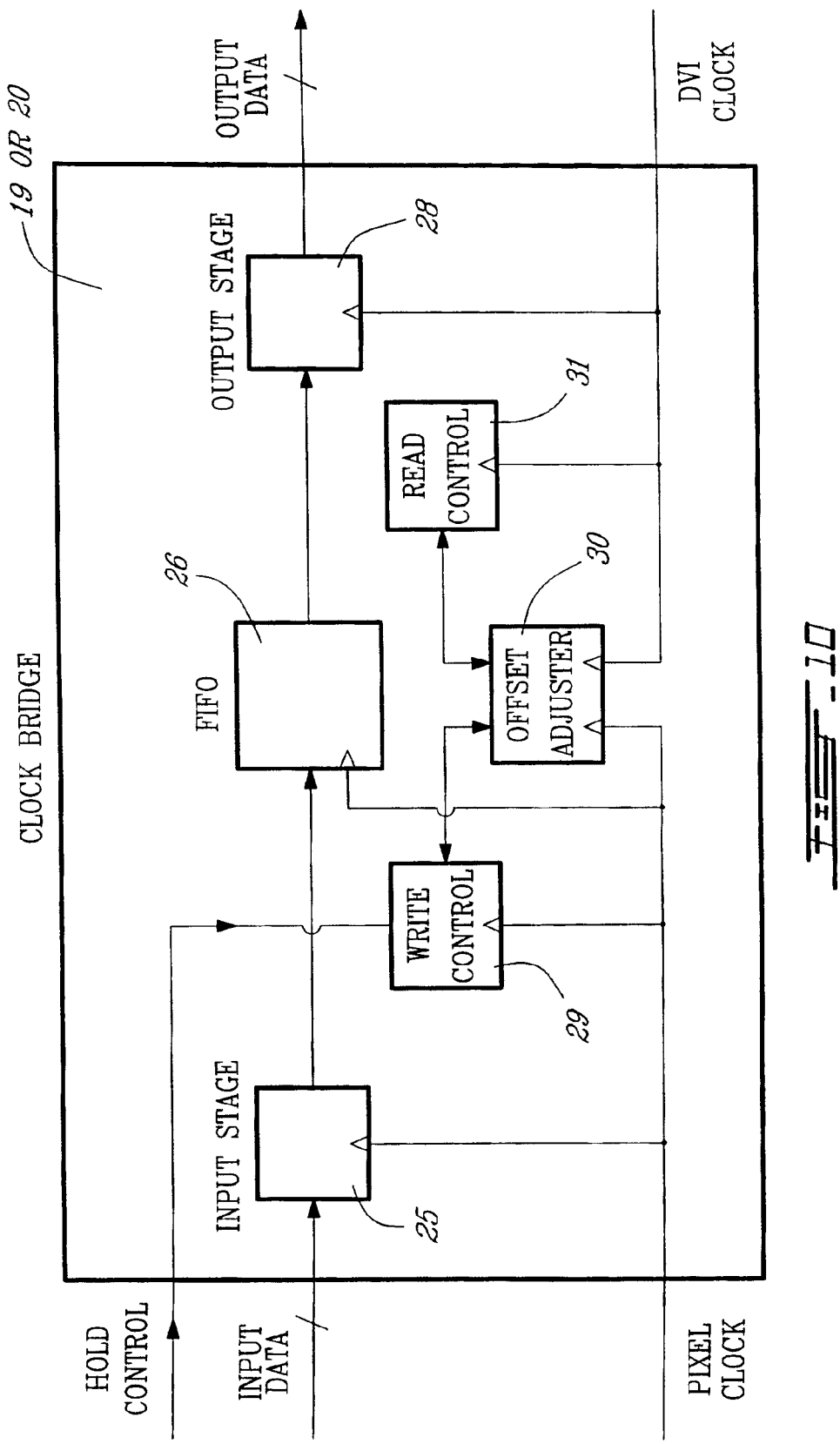

METHOD AND APPARATUS FOR MULTI-DISPLAY OF DIGITAL VISUAL INTERFACES

FIELD OF THE INVENTION

The invention relates to enabling multi-display output to a plurality of display devices. More specifically, it relates to driving dual displays having Digital Visual Interface (DVI).

BACKGROUND OF THE INVENTION

The Digital Visual Interface (DVI) is widely accepted as the standard digital interface for digital display devices like flat panels. The Digital Display Working Group (DDWG) developed the specification for DVI. DVI uses Silicon Image's PanelLink technology, which is a high-speed serial interface that uses transition minimized differential signaling (TMDS) to send data to the monitor.

Transition minimized refers to a reduction in the number of high-to-low and low-to-high swings on a signal. Differential describes the method of transmitting a signal using a pair of complementary signals. The encoding uses logic to minimize the number of transitions, which helps avoid excessive electromagnetic interference levels on the cable, thereby increasing the transfer rate and improving accuracy.

DVI allows for two TMDS logical links according to a specification, called Dual-Link. Each link is composed of 3 differential data pair (RGB+control signals), shares a differential clock pair and, using the present standard, has a maximum bandwidth of 165 MHz for a single link and 330 MHz for two links. The DVI specification requires that once a mode requires a pixel clock greater than 165 MHz, then it must use the second link as well. The two links share the same clock so that the bandwidth is evenly divided between them. The system enables one or both links, depending on the capabilities of the monitor. Dual-Link uses a first one of the data links to transmit odd pixels and the second data link to transmit even pixels.

DVI also takes advantage of other features built into existing display standards. For example, provisions are made for Extended Display Identification Data (EDID) specifications, which enable the monitor, graphics adapter, and computer to communicate and automatically configure the system to support the different features available in the monitor.

In the state of the art, Dual-Link allows for high-resolution display on one output device. There is a need to drive two flat panel screens together, but to have their displays independent from each other. This need is fed by the desire for more ergonomic work areas with displays of increased real estate. The cost of buying two 15 inch monitors is significantly low compared to the cost of buying one 19 inch monitor. Similarly, a flat panel screen takes up a lot less room on a work area, such as a desk, than a standard monitor does.

Moreover, the digital panel display market is growing from month to month. With the pressure on graphics adapter manufacturers to produce products for the digital panel market, there is a growing need for a system that can accommodate not only one digital display, but also two simultaneous ones with independent images.

SUMMARY OF THE INVENTION

Accordingly, an object of the present invention is to allow a system that can drive two displays that use Digital Visual Interface (DVI) for displaying two separate pictures on two separate output devices simultaneously. In the specification, this is referred to as dual DVI.

Another object of the present invention is to allow a system that can selectively drive two displays, each using a single link, or one high-resolution display using two single links, allowing twice the bandwidth for one display. In this specification, Dual-Link is used to mean a system that can display an image using two pipelines by sending data representing a first portion of the image via one pipeline and data representing a second portion of the image via the second pipeline.

According to a first broad aspect of the present invention, there is provided an apparatus for providing output to at least two digital displays, said apparatus comprising a serializer having a first channel and a second channel, an odd pixel input, an even pixel input, an odd pixel output, an even pixel output, and a serializer clock controlling the first and second channels, synchronized with a pixel clock signal and having an output adapted to feed at least two digital displays over separate channels; a first display controller output carrying a first display pixel stream connected to the odd pixel input; a second display controller output carrying a second display pixel stream connected to the even pixel input, the first and second display pixel streams synchronized according to the pixel clock signal; a first digital display connector operatively connected between the odd pixel output, the serializer clock output, and a first single link digital display; and a second digital display connector operatively connected between the even pixel output, the serializer clock output, and a second single link digital display.

Preferably, an external amplifier is used to amplify a clock signal used to drive the dual displays. Also preferably, an encoder encodes each of the two display pixel streams externally from the serializer.

Alternatively, the apparatus can further comprise a primary requestor to generate the first display pixel stream; an overlay requestor to generate the second display pixel stream; a blender unit receiving an output from the primary requestor and an output from the overlay requestor and producing a blended output, wherein the blended output is the first display controller output; and wherein the output from the overlay requestor is also the second display controller output and the primary requestor and the secondary requestor are driven by the pixel clock.

According to a second broad aspect of the present invention, there is provided an apparatus for providing output to at least two digital displays, the apparatus comprising: a serializer having a first channel and a second channel, an odd pixel input, an even pixel input, an odd pixel output, an even pixel output, and serializer clock circuitry synchronized with a pixel clock signal and having output for at least two digital displays; a first display controller output carrying a first display pixel stream connected to the odd pixel input; a second display controller output carrying a second display pixel stream connected to the even pixel input, the first and second display pixel streams being synchronized according to the pixel clock signal; a first clock bridge circuit that synchronizes the first digital display pixel stream from a first clock rate to a second clock rate; a second clock bridge circuit that synchronizes the second digital display pixel stream from a first clock rate to a second clock rate; a hold control circuit to control the first clock bridge circuit, and the second clock bridge circuit, wherein the hold control circuit sends a hold signal indicating that data is to be held for a clock cycle; a multiplexor to selectively transmit to the second channel at least one of the first display pixel stream and the second display pixel stream; a digital display connector operatively connected to the odd pixel output, the even pixel output, and the serializer clock output.

BRIEF DESCRIPTION OF THE DRAWINGS

These and other features, aspects and advantages of the present invention will become better understood with regard to the following description and accompanying drawings wherein:

FIG. 10 is a block diagram of a clock bridge circuit.

DETAILED DESCRIPTION OF THE PREFERRED EMBODIMENT

While illustrated in the block diagrams as ensembles of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

Figure 1:
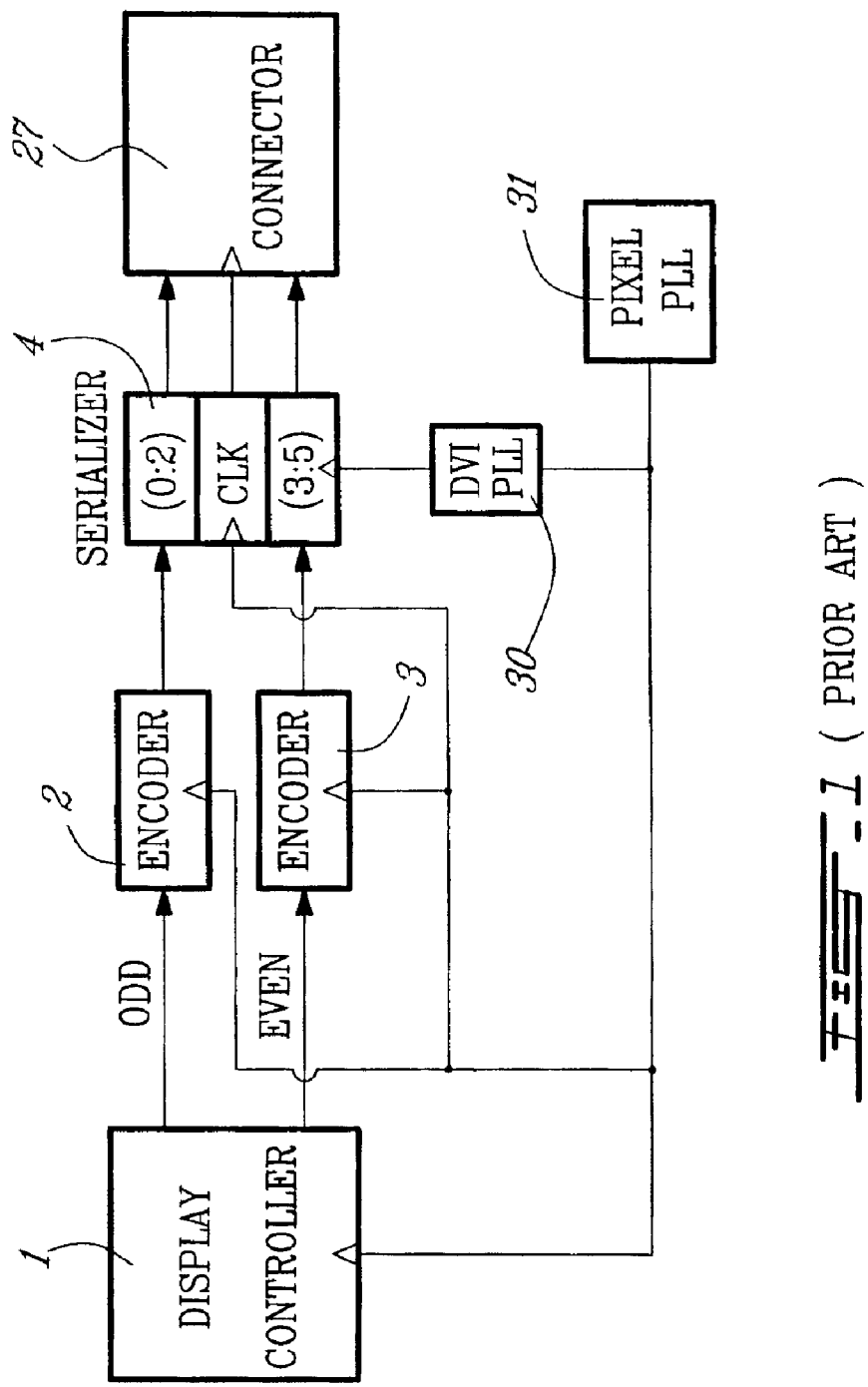
FIG. 1 is prior art showing a Dual-Link connection for one high-resolution display.

FIG. 1 represents a standard Dual-Link setup used to drive a single flat panel monitor. A display controller 1 comprises two outputs, each sent to an encoder 2 and 3 to encode the data, and then sent to a Transition Minimized Differential Signaling (TMDS) unit, herein called a serializer 4. Each link is composed of three data channels for RGB information, each with an associated encoder. The encoders 2 and 3 accept RGB data from the display controller 1 and convert it into transition controlled and DC balanced data streams. A data enable signal (not shown) qualifies the active data area. The data enable signal is always required and must be high for active video time and low during blanking. The encoders 2 and 3 are required to encode the RGB data during active display time to generate encoded data. The serializer 4 then takes the encoded data as an input and serializes it according to the differential data pair speed required for the display. A serial input clock 30 (or DVI clock) and a pixel clock 31 drive the serializer 4. The two serializer 4 channels share one clock pair as the output.

One output from the display controller 1 transmits only the odd pixels of a frame while the other output transmits only the even pixels from the same frame. This is a standard procedure used to provide higher resolution at a bandwidth that exceeds 165 MHz. This configuration is used to drive a single digital flat panel screen. A Phase-Locked Loop (PLL) 30 generates a X10 clock signal that drives the serializer 4, defined as the serial input clock. The pixel PLL 31 generates the pixel clock that drives the display controller 1, the encoders 2 and 3, and the serializer 4. The pixel clock is also fed as input to the PLL 30. The outputs of the serializer 4 are sent to a connector 27 to which one end of a cable can be connected, the other end being connected to an output display.

Figure 2:
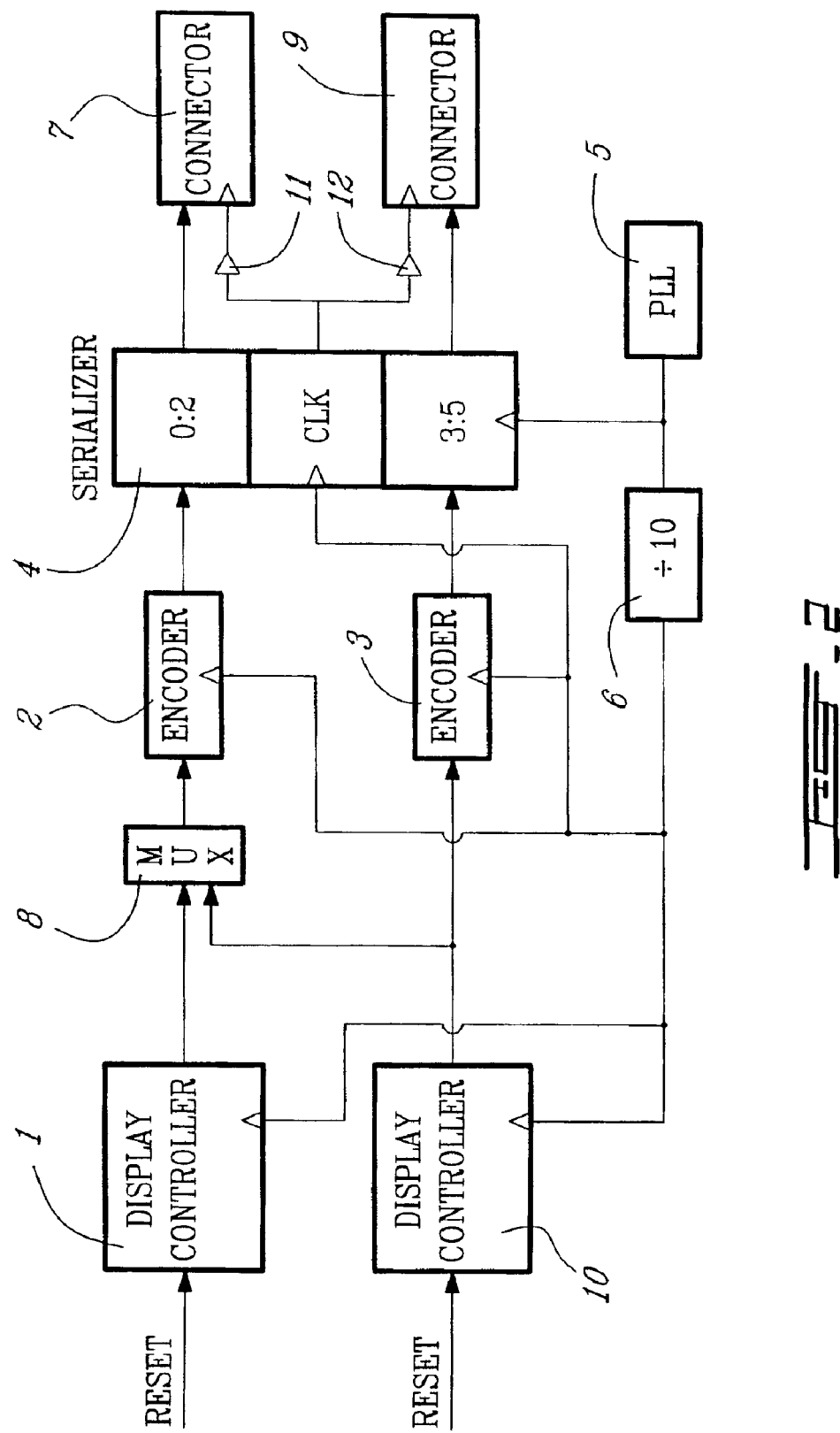
FIG. 2 is a block diagram showing a dual DVI connection for two displays.

The present invention uses part of the configuration shown in FIG. 1 to drive two low resolution displays. In a preferred embodiment, the two displays are digital flat panels and use Digital Visual Interface (DVI), and the two displays are driven with separate images. FIG. 2 illustrates how this is done. A first display controller 1 sends its output data to an encoder 2 through a multiplexor 8. The second input of the multiplexor 8 comes from a second display controller 10, completely independent from display controller 1. The multiplexor 8 selects which of the two data inputs will be sent to encoder 2. Mux 8 can be used to output a simultaneous display from controller 10. Data coming from the display controller 10 is also sent directly to encoder 3. The encoders 2 and 3 send encoded data to the serializer 4. Serializer 4 accepts a first set of data on its 0:2 channel input lines and a second set of data on its 3:5 channel input lines. The data is then sent to two separate connectors 7 and 9, one for each output display. Similarly to driving a single display, a PLL 5 generates a serial input clock signal that drives the serializer 4. The serial input clock signal is fed to a divide by ten circuit 6 to generate the pixel clock that is used to drive display controller 1, display controller 10, encoders 2 and 3, and the inputs to serializer 4. The pixel clock 6 and the serial input clock 5 drive the serializer 4.

FIG. 2 also shows how the clock signal coming from the serializer 4 is amplified to drive connectors 7 and 9 without adding any appreciable delay to the clock signal. This is necessary in order to have the capability to drive two displays instead of the regular one display for which the clock of a standard serializer was originally designed. Two amplifiers 11 and 12 are used to amplify the clock signal coming from the clock output of the serializer 4. The outputs of the serializer 4 are sent to a pair of connectors 7 and 9 for the output displays. The 0:2 output lines of the serializer 4 are sent to the 0:2 input lines of connector 7 and the 3:5 output lines of the serializer 4 are sent to the 0:2 input lines of connector 9. Separate data is sent to each connector individually and each output display is connected via its respective connector to receive the data and display it on its screen.

Figure 3:
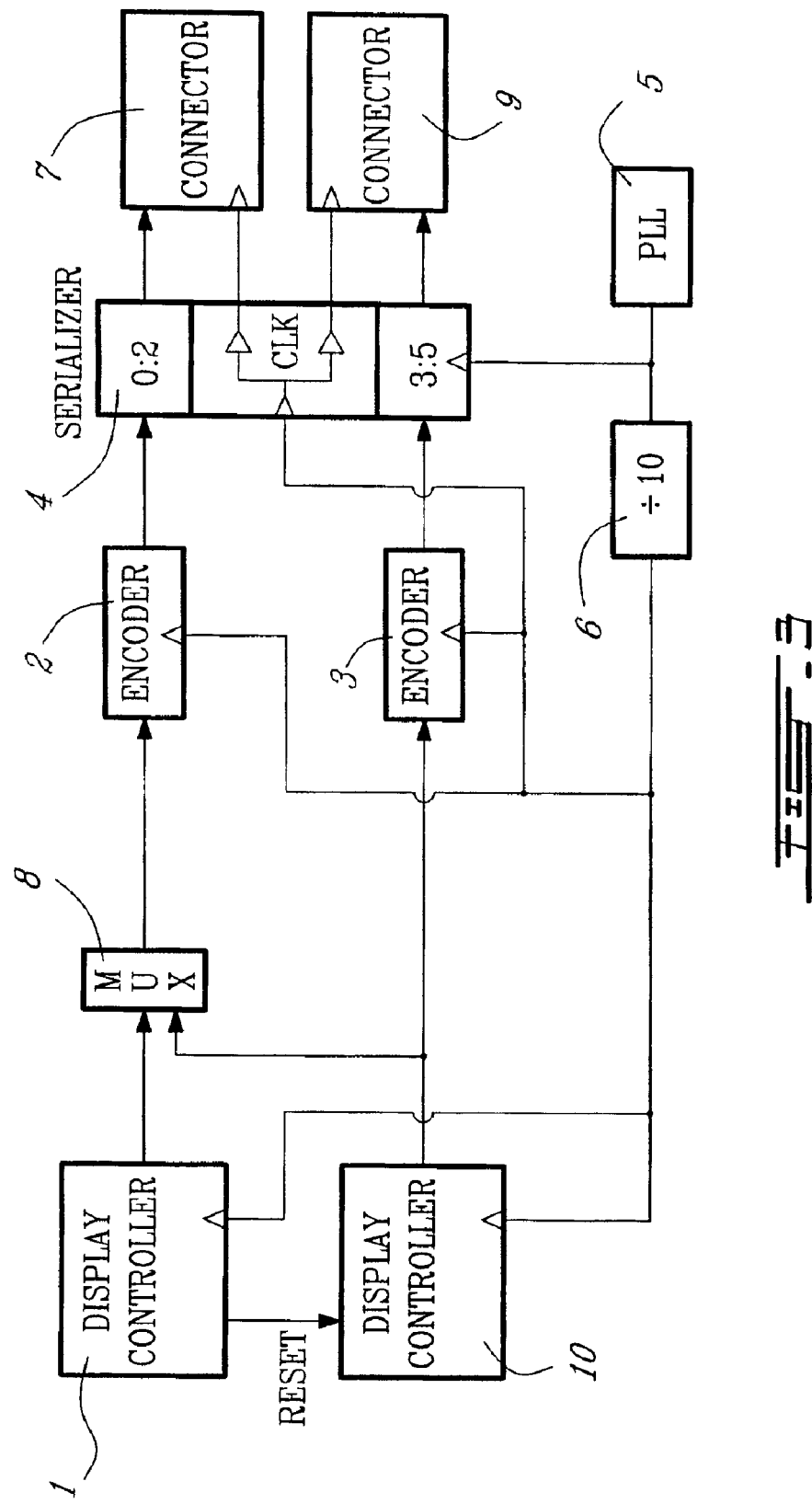
FIG. 3 is a block diagram of dual DVI with two internal clock buffer pinouts.

An alternative embodiment for the amplification of the clock is shown in FIG. 3. The amplification can be built-in to the serializer 4. As in the previous embodiment, there are two amplifiers 11 and 12, one for each link, and it follows that there are also two clock pin-outs for the serializer 4. There is still only one clock in the serializer 4. The amplifiers 11 and 12 perform the same function as they do when they are external. The clock signals are amplified in order to drive two digital displays.

Figure 4:
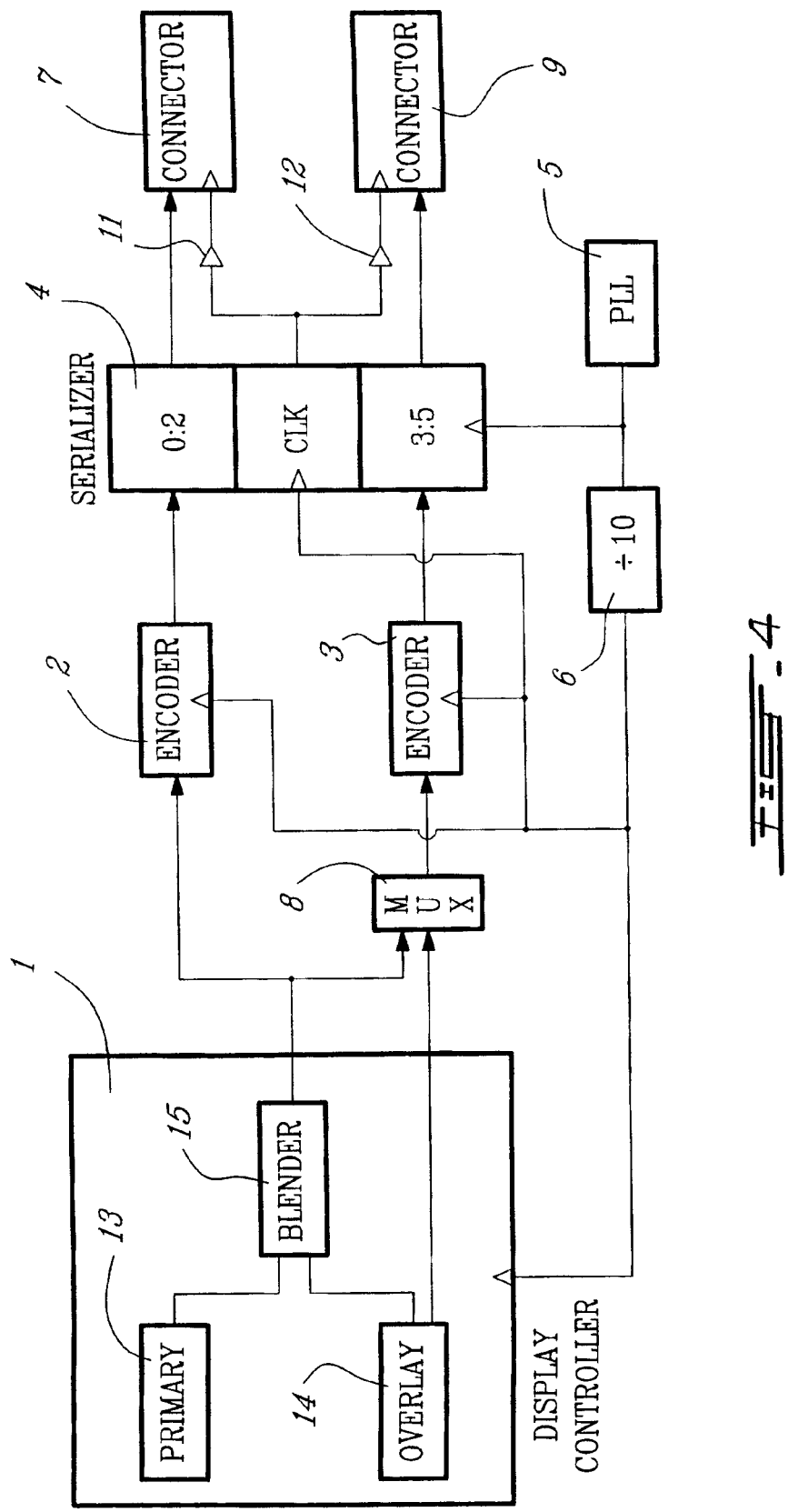
FIG. 4 is a block diagram of dual DVI with one display controller.

Alternatively, the two display controller outputs can be implemented via a single display controller 1, wherein the one unit comprises a primary requester 13 and an overlay requester 14. This embodiment is illustrated in FIG. 4. Both requesters 13 and 14 transmit their data to a blender unit 15 that combines the data from the two into one and transmits its output to encoder 2. The overlay requestor 14 also sends its data from the display controller 1 to a multiplexor 8. The multiplexor 8 selects between the data from the blender unit 15 and the overlay requestor 14 to send to encoder 3 so as to choose from independent dual display output and a simultaneous mode. Encoders 2 and 3 then proceed to transmit to serializer 4 and the rest of the process remains the same as the case where there are two separate display controllers 1 and 10. Clearly, the variances illustrated in FIGS. 2 and 3 for the amplification of the clock signal are valid for the single display controller embodiment in FIG. 4 as this change does not affect the serializer or the output of the process. The original purpose of a display controller with an overlay requester and a primary requestor is to blend two signals together, i.e. perform an overlay of a first signal onto a second signal. Although this configuration exploits the display controller for another purpose, it remains possible to use the display controller in FIG. 4 for its original purpose. Multiplexor 8 selects which of the sets of inputs, either two separate unblended pixel streams or twice the blended pixel stream, will be sent to the serializer 4. If the signals are blended, then an identical blended image will appear on each of the output displays. If the two signals are not blended, then two separate images will appear on the output displays, respectively. Separate control signals (not shown) allow a signal from the primary requestor 13 or the overlay requestor 14 to pass through the blender 15 without actually being blended. Therefore, a signal from primary requester 13 can be sent to the 0:2 channel input lines of the serializer 4 while a signal from the overlay requestor is sent to the 3:5 channel input lines of the serializer 4.

Figure 5:
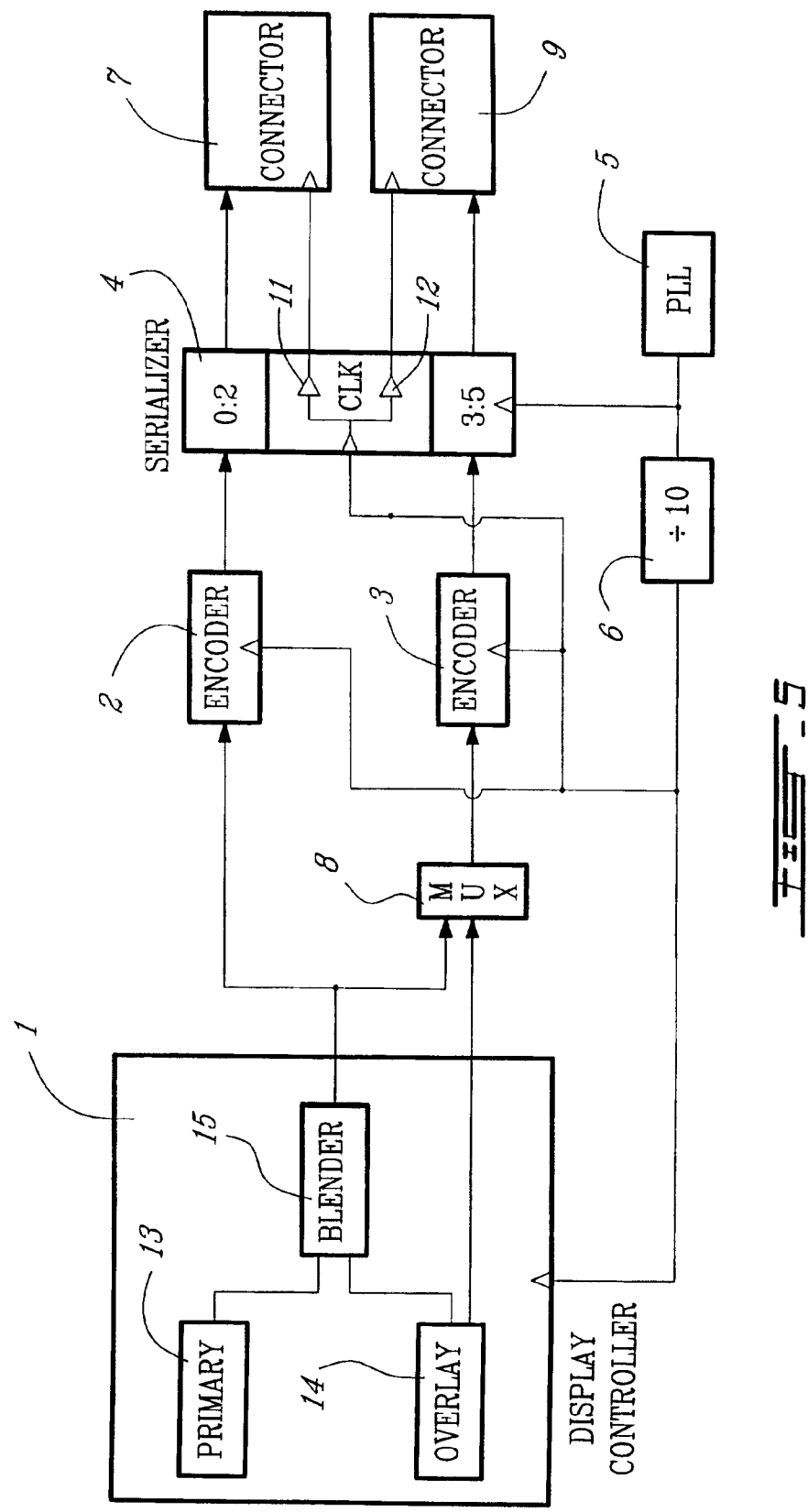
FIG. 5 is a block diagram of dual DVI with one display controller and two internal clock buffer pinouts.

As is the case for the two display controller configuration, there are alternative ways of implementing the clocks that will drive the output displays. FIG. 5 demonstrates yet another embodiment, wherein serializer 4 has two clock outputs, yet the amplification of the clock signals is done externally to the serializer 4. Amplifiers 11 and 12 amplify each clock signal in order for the signal to be strong enough for each of the two output displays.

An important aspect of driving dual displays simultaneously is the synchronizing of the two displays. For the preferred embodiment, this is required when the two displays are operating at the same resolution. Synchronizing the two displays is done by synchronizing the two display controllers 1 and 10. There are two ways in which this can be done: via software and via hardware. FIG. 2 demonstrates the software implementation. A reset input is provided to each display controller 1 and 10 and software dictates the timing of the controllers to ensure synchronization. FIG. 3 demonstrates the hardware implementation of the reset. Display controller 1 is connected to display controller 2 via hardware. This connection provides a reset to synchronize the two display controllers 1 and 10 together. The clock that drives each display controller 1 and 10 is still generated by the PLL 5 after it has passed through the divide by ten block 6. The added reset simply allows the two display controllers 1 and 10 to be set to zero at the same point in time in order for their frames to be synchronized. In the case that the PLL 5 or pixel clock is internal to the display controllers 1 and 10 (not shown), a pixel clock connection between the two display controllers 1 and 10 would be required.

If the two displays are run at different resolutions but on same clock, then the two display controllers 1 and 10 do not need to be synchronized because they are running independently of each other.

Figure 6:
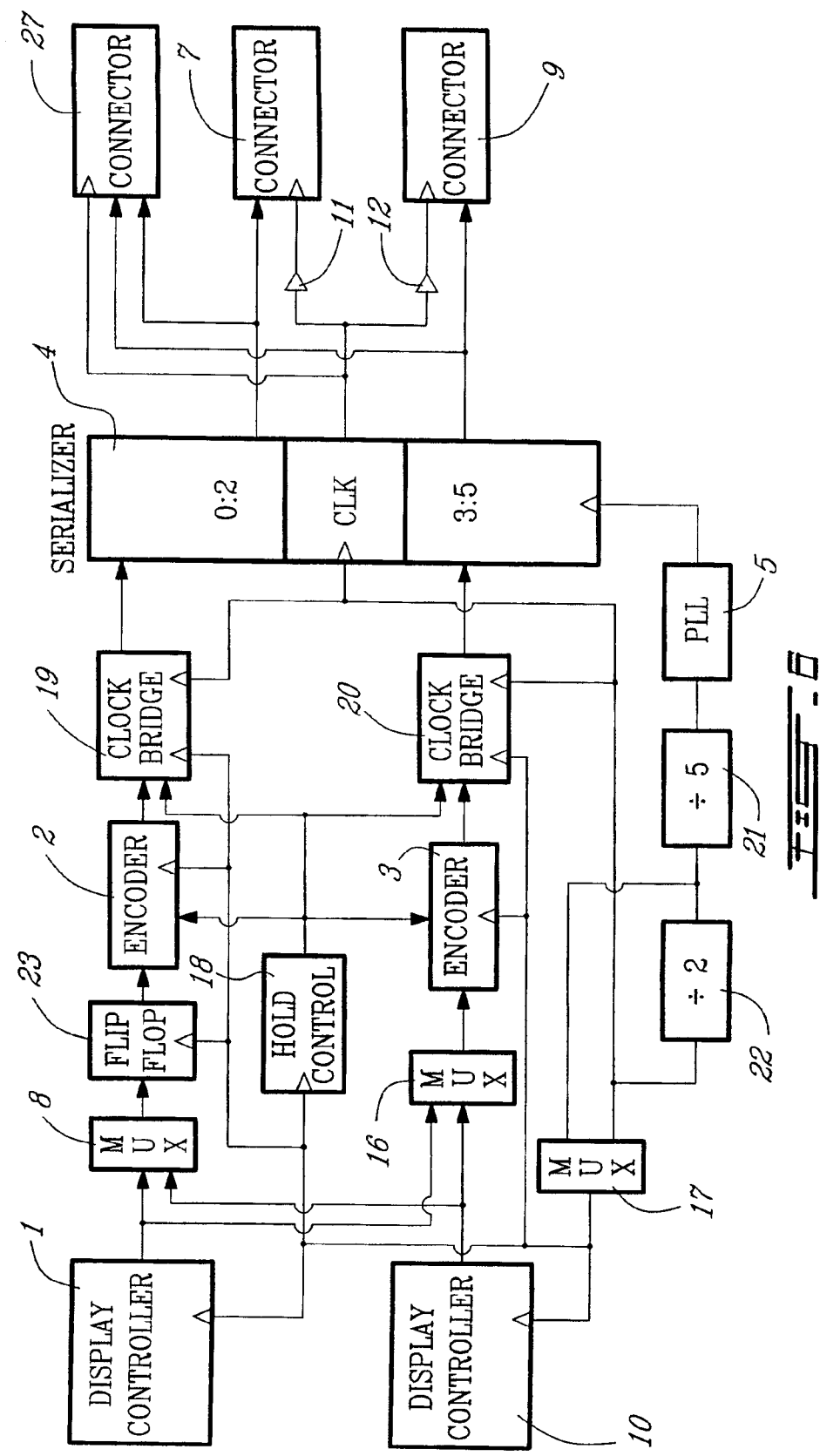
FIG. 6 is a block diagram of dual DVI and Dual-Link.

The Dual-Link setup described in FIG. 1 is used to drive a high-resolution display. While it is desirable to drive two low-resolution digital displays, it is also desirable to have the capability of selectively driving one high-resolution display and two low-resolution displays. This embodiment is illustrated in FIG. 6. Two multiplexors 8 and 16 are used to select what data will be sent to the output displays. A first multiplexor 8 receives data from both display controllers 1 and 10. Its output is sent to an encoder 2 via a flip-flop 23. The flip-flop stage 23 before the encoder aligns the odd pixel stream with the even pixel stream to allow encoder 2 and encoder 3 to work simultaneously. This is used when this setup is used to drive one high resolution output display and the data stream is separated into odd and even pixel streams. In the case where the image data were separated another way, for example upper half and lower half of a screen, a flip-flop would not be necessary. A second multiplexor 16 also receives the input data from display controller 1 and display controller 2 and selectively transmits one of the two to encoder 3. Once all of the data has reached encoders 2 and 3, it is sent to clock bridge 19 and clock bridge 20, respectively. The clock bridge circuits 19 and 20 take encoded data as input and pass it on to the serializer 4. The clock line does not bear the same frequency as the data rate on the transmission wire. The clock bridge circuits 19 and 20 are needed for synchronizing the data streams from one clock signal to another. The serializer 4 then takes the data, serializes it, and sends it out to the various connectors. If the setup is used for two low resolution displays, data is sent to connectors 7 and 9. If the setup is used for one high resolution display, data is sent to connector 27.

In this embodiment, amplifiers 11 and 12 are used to amplify the clock signal for the two low resolution displays. A PLL 5 that generates a clock drives the serializer 4 and is defined as the serial input clock. The serial input clock is passed through a divide by five (divider) 21 to provide a DVI-2 clock, which in turn is passed through a divide by 2 (divider) 22 to provide a DVI clock. A multiplexor 17 selects the DVI clock as the pixel clock for single or dual DVI setup and the DVI-2 clock as the pixel clock for dual link setup to drive the display controllers 1 and 10, the encoders 2 and 3, and the clock bridge circuits 19 and 20. In this case the serializer 4 is driven by the DVI clock and the serial input clock.

Also present in the configuration is a hold control circuit 18. The hold control circuit 18 sends a hold signal to both the encoders 2 and 3 and the clock bridge circuits 19 and 20 to hold data depending on whether it is receiving the data from the odd or even pixel stream. The hold control circuit 18 works with the flip-flop stage 23 as described above. The hold control circuit 18 will hold only for dual link setup. For this configuration, one channel of the serializer 4 transmits odd pixels while the other channel of the serializer 4 transmits even pixels.

Figure 7:
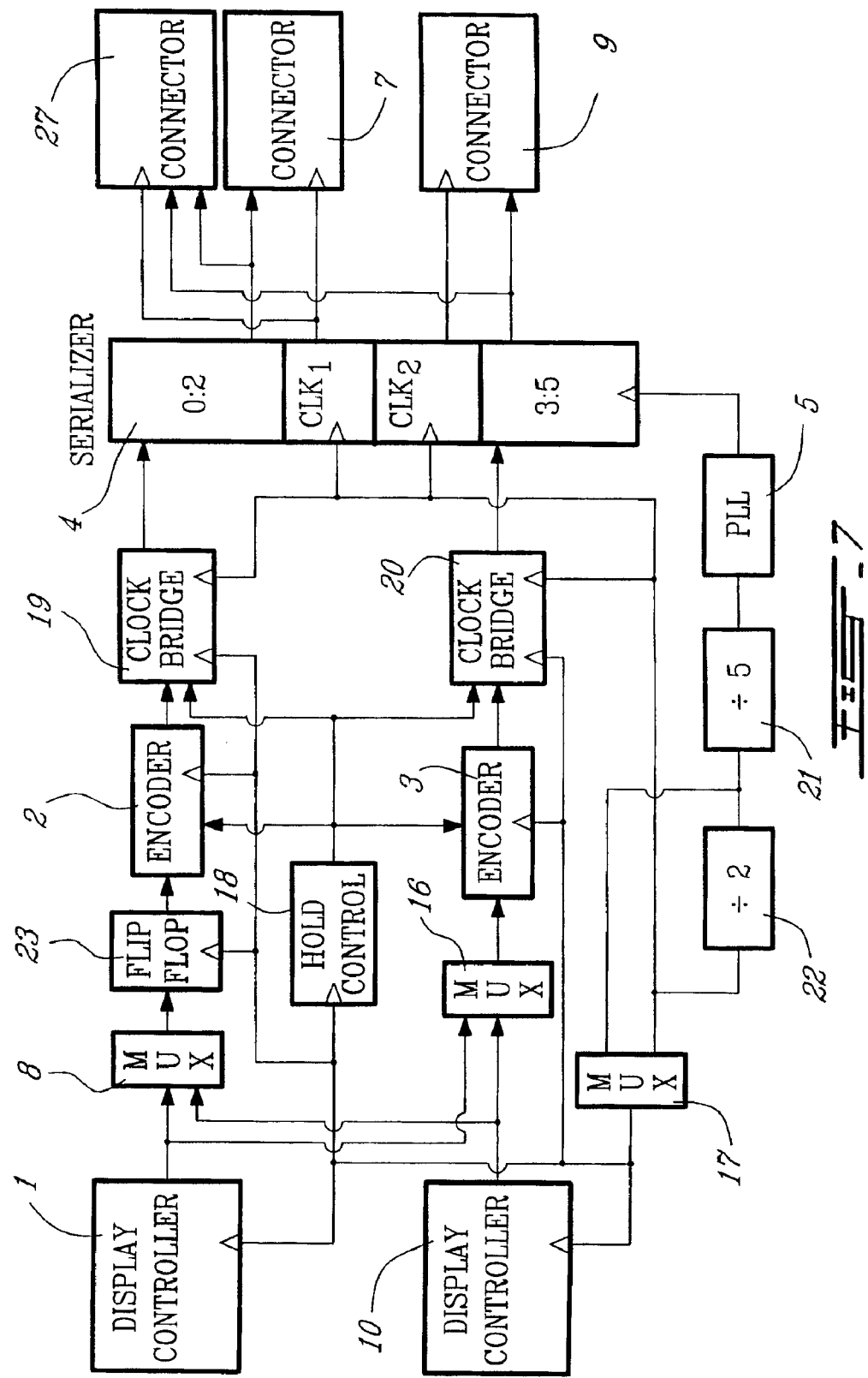
FIG. 7 is a block diagram of dual DVI and Dual-Link with two serializer clocks.

Alternatively, the serializer 4 can have two clock output pins. In this case, the DVI clock is split into two clocks and amplified using internal buffers to provide two clock pin outs [clk1 & clk2] for serializer 4. Connector 7 and connector 27 are driven by clk1 and connector 9 is driven by clk2. This situation is depicted in FIG. 7. The connection between both channels of the serializer 4 and connector 27 is done via a special cable. Whether the display controllers 1 and 10 display the same images or different images, and whether they have the same resolution or different resolutions, the two controllers 1 and 10 do not necessarily need to be synchronized. Internal Amplifiers 11 and 12 amplify the clock signals to run each low resolution output display.

Figure 8:
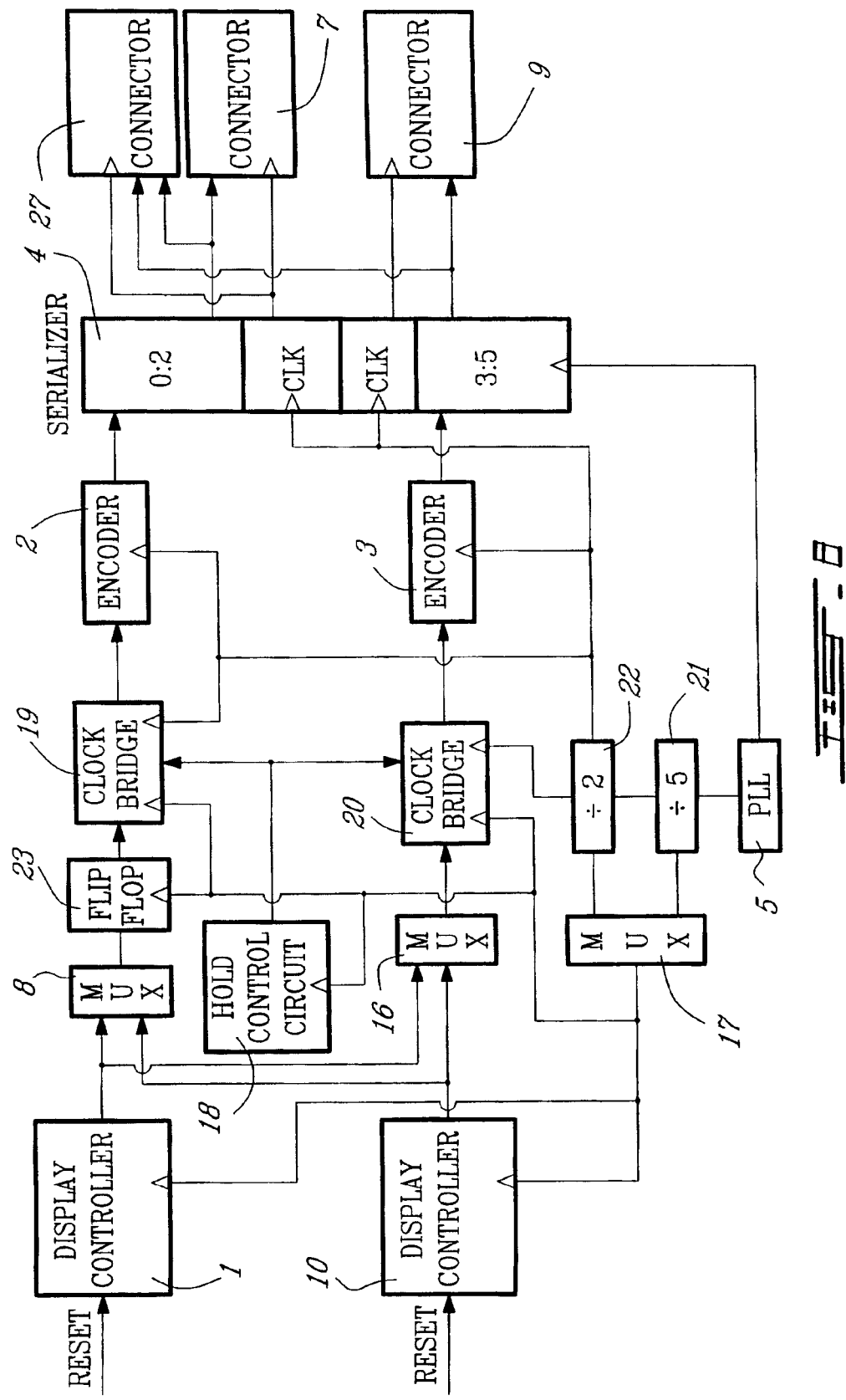
FIG. 8 is an alternative embodiment of FIG. 6.

An alternative embodiment for the dual DVI and Dual-Link setup is shown in FIG. 8. The clock bridge circuits 19 and 20 are before the encoders 2 and 3. This does not impact the functioning of the circuit.

Figure 9:
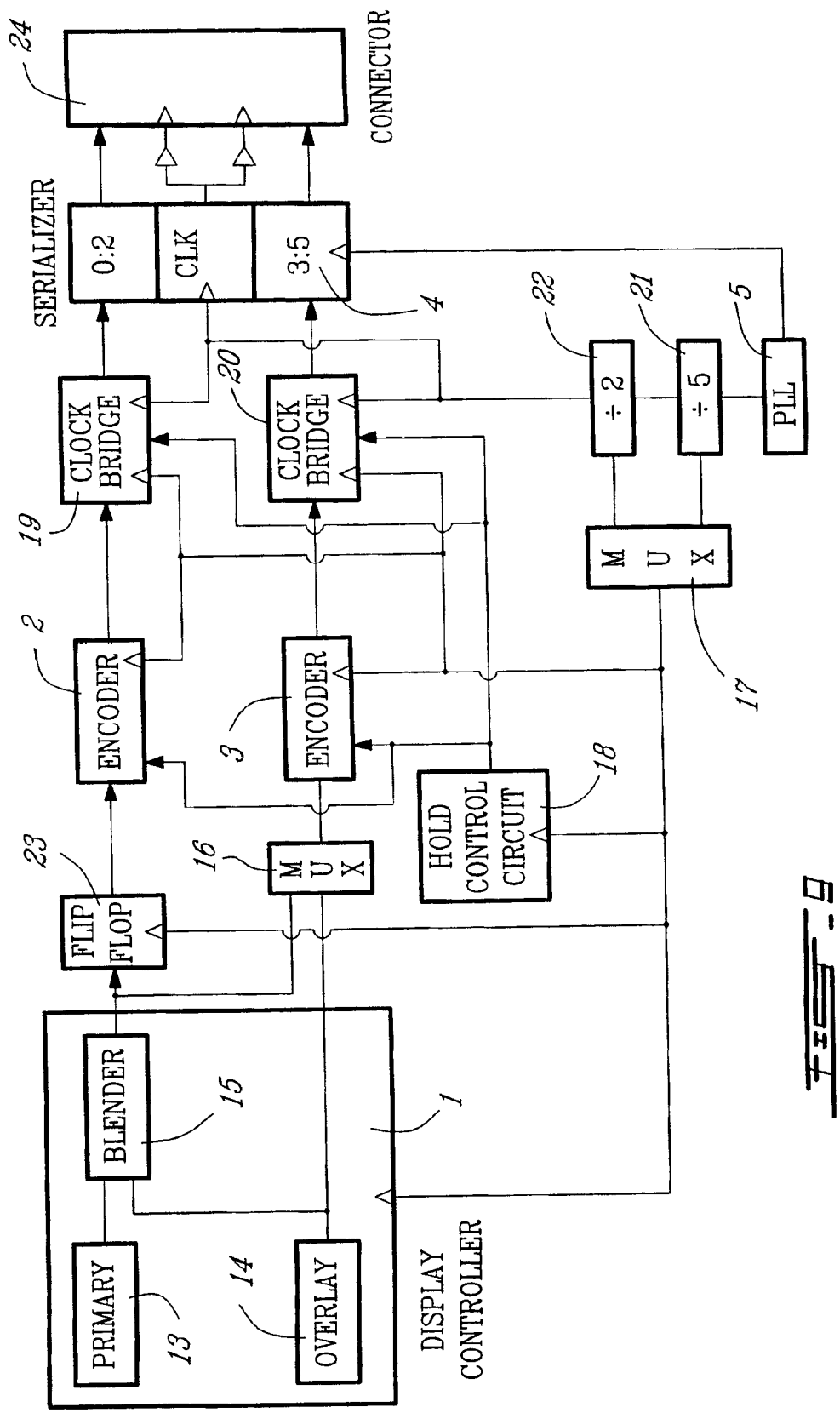
FIG. 9 is an alternative embodiment of FIG. 7.

FIG. 9 shows the dual DVI and Dual-Link setup with only one display controller. In this embodiment, an output from the blender unit 15 is sent to a flip-flop 23 and then to encoder 2. The output of the overlay requester 14 is sent to the blender unit 15 as well as to encoder 3. The rest of the process is the same as when there are two display controllers 1 and 10, as depicted in FIG. 8. Also shown in FIG. 9 is a non-standard connector 24. A high-density connector such as an LFH-60 can be present on the graphics card and a special cable can allow the connection of two low-resolution displays or one high resolution display to connector 24.

There are two types of connectors that are used in the preferred embodiment. The first is the Low Force Helix LFH-60 connector. For dual DVI, a cable assembly goes from the LFH-60 connector to two DVI (25 pin) connectors, each of the two DVI connectors being connectable to a flat panel display. For dual link, a special cable is needed to connect one dual link monitor to the LFH-60. The second type of connector used is the MicroCross DVI connector integrated on the graphics board. In this case, there must be two of these connectors on the board (25 pins each). To drive two low-resolution flat panel displays, the displays are connected directly to the connectors. To drive one high-resolution flat panel display, a special cable assembly comprising two connectors to one connection to connect the Dual-Link monitor is needed.

An alternate embodiment comprises daisy-chaining the two low-resolution monitors. In this case, one LFH-60 connector is present on the graphics card. Either one high-resolution monitor or one low-resolution monitor can be connected to the LFH-60 connector via a cable. If a low-resolution monitor is connected, a second low-resolution monitor can be connected to the first low-resolution monitor.

FIG. 10 shows the block diagram for the clock bridge circuit 19 and 20. It has an input stage 25 and an output stage 28. The input stage 25, write control 29, First In First Out (FIFO) unit 26, and write control 29 are driven by the pixel clock. The output stage 28, and read control 31 are driven by the DVI clock. The input stage 25 writes data into the FIFO 26 and output stage 28 reads data from the FIFO 26. The write control 29 and read control 31 are controlled by an offset adjuster 30 to ensure that the output stage 28 does not read data from FIFO 26 from the same location as the input stage 25 is writing the data. The offset adjuster 30 is driven by both the pixel clock and the DVI clock. The FIFO 26 accepts the serial input data stream from the encoder 2 and 3 and passes it on to the output stage 28. The output data stream from the clock bridge 19 and 20 is fed to the serializer 4.

It should be noted that the present invention can be carried out as a method, can be embodied in a system, a computer readable medium or an electrical or electro-magnetic signal.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. An apparatus for providing output to at least two digital displays, said apparatus comprising:
    a serializer having a first channel and a second channel, a first pixel input a second pixel input, first pixel output, second pixel output, and a serializer clock controlling said first and second channels, synchronized with a pixel clock signal and having an output adapted to feed at least two digital displays over separate channels;
    a first display controller output carrying a first display pixel stream connected to said first pixel input;
    a second display controller output carrying a second display pixel stream connected to said second pixel input, said first and said second display pixel streams synchronized according to said pixel clock signal;
    a first digital display connector operatively connected between said first pixel output, said serializer clock output, and a first single link digital display; and
    a second digital display connector operatively connected between said second pixel output, said serializer clock output, and a second single link digital display.

2. An apparatus as claimed in claim 1, said apparatus further comprising:
    a first encoder having an input being selectively one of said first display pixel stream and said second display pixel stream and an output operatively connected to said first channel of said serializer; and
    a second encoder having as input said second display pixel stream and an output operatively connected to said second channel of said serializer.

3. An apparatus as claimed in claim 1, further comprising an external clock signal amplifier circuit to amplify a clock signal from said serializer clock so as to provide said first digital display and said second digital display with an essentially undistorted clock signal.

4. An apparatus as claimed in claim 1, further comprising:
    a primary requester to generate said first display pixel stream;
    an overlay requester to generate said second display pixel stream;
    a blender unit receiving an output from said primary requestor and an output from said overlay requestor and producing a blended output, wherein said blended output is said first display controller output;
    wherein said output from said overlay requestor is also said second display controller output and said primary requestor and said secondary requester are driven by said pixel clock.

5. An apparatus as claimed in claim 1, wherein said serializer clock further comprises a first pixel clock output and a second pixel dock output, said first pixel clock output operatively connected to said first digital display connector and said second pixel clock output operatively connected to said second digital display connector.

6. An apparatus as claimed in claim 2, further comprising:
    a first clock bridge circuit that synchronizes said first digital display pixel stream from a first clock rate to a second clock rate;
    a second clock bridge circuit that synchronizes said second digital display pixel stream from a first clock rate to a second clock rate;
    a hold control circuit to control said first encoder, said second encoder, said first clock bridge circuit, and said second clock bridge circuit, wherein said hold control circuit sends a hold signal indicating that data is to be held for a clock cycle; and
    a multiplexor to selectively transmit to said second encoder at least one of said first display pixel stream and said second display pixel stream.

7. An apparatus as claimed in claim 6, further comprising a third digital display connector operatively connected between said first pixel output, said second pixel output, said pixel clock, and a dual link digital display.

8. An apparatus as claimed in claim 4, further comprising:
   a first clock bridge circuit that synchronizes said first digital display pixel stream from a first clock rate to a second clock rate;
   a second clock bridge circuit that synchronizes said second digital display pixel stream from a first clock rate to a second clock rate;
   a hold control circuit to control said first encoder, said second encoder, said first clock bridge circuit, and said second clock bridge circuit, wherein said hold control circuit sends a hold signal indicating that data is to be held for a clock cycle; and
   a multiplexor to selectively transmit to said second encoder at least one of said first display pixel stream and said second display pixel stream.

9. An apparatus as claimed in claim 6, further comprising an external clock signal amplifier circuit to amplify a clock signal from said serializer clock, so as to provide said first digital display and said second digital display with an essentially undistorted clock signal.

10. An apparatus as claimed in claim 6, wherein said serializer clock further comprises a first pixel clock input, a second pixel clock input, a first pixel clock output and a second pixel clock output, said first pixel clock output operatively connected to said first digital display connector and said second pixel clock output operatively connected to said second digital display connector.

11. An apparatus for providing output to at least two digital displays, said apparatus comprising:
   a serializer having a first channel and a second channel, first pixel input, a second pixel input, a first pixel output, a second pixel output, and serializer clock circuitry synchronized with a pixel clock signal and having output for at least two digital displays;
   a first display controller output carrying a first display pixel stream connected to said first, pixel input;
   a second display controller output carrying a second display pixel stream connected to said second pixel input, said first and said second display pixel streams being synchronized according to said pixel clock signal;
   a first clock bridge circuit that synchronizes said first digital display pixel stream from a first clock rate to a second clock rate;
   a second clock bridge circuit that synchronizes said second digital display pixel stream from a first clock rate to a second clock rate;
   a hold control circuit to control said first clock bridge circuit, and said second clock bridge circuit, wherein said hold control circuit sends a hold signal indicating that data is to be held for a clock cycle;
   a multiplexor to selectively transmit to said second channel at least one of said first display pixel stream and said second display pixel stream; and
   a digital display connector operatively connected to said first pixel output, said second pixel output, and said serializer clock output.

12. A method for driving at least two digital displays with independent images, said method comprising:
   providing a serializer having two separate channels and a serialized clock controlling said channels, synchronized with a pixel clock signal, and having an output adapted to feed at least two digital display;
   transmitting data along at least two buses to said serializer,
   serializing said data using said serializer;
   transmitting serialized data from said channels and said serializer clock output via cables to said at least two digital display.

13. A method for selectively driving one of two digital displays with independent images and one higher resolution digital display, said method comprising:
   channeling pixel data along two buses to a serializer having two channels in accordance with a selected one of two display modes;
   serializing said data using said serializer;
   transmitting serialized date from said channels and a serializer clock to one of: said two digital displays and said higher resolution digital display, in accordance with said selected one of two display modes.

14. A method as claimed in claim 13, further comprising:
   providing a connector for said serialized data and said serializer clock signal from said channels; and
   selectively connecting one of a bifurcated cable having a first end going into said connector, a first display end going into a first one of said two digital displays, and a second display end going into a second one of said two digital displays, and a non-bifurcated cable having a first end going into said connector and a second end going into said higher resolution digital display.

* * * * *

UNITED STATES PATENT AND TRADEMARK OFFICE
CERTIFICATE OF CORRECTION

PATENT NO. : 6,903,706 B1  Page 1 of 1
APPLICATION NO. : 10/101503
DATED : June 7, 2005
INVENTOR(S) : Lorne Trottier et al.

It is certified that error appears in the above-identified patent and that said Letters Patent is hereby corrected as shown below:

In figure 10, the read control 31 should be read control 41.
In figure 10, the offset adjuster 30 should be offset adjuster 40

Column 7, line 38 should state; read control 41.
Column 7, line 41 should also state; read control 41.
Column 7, line 42 should read; offset adjuster 40.
Column 7, line 44 should also read offset adjuster 40.

Column 8, line 2, a comma should be present between "first pixel input" and "second pixel input".
Column 8, line 49, the word "dock' should be "clock".
Column 9, line 41, the comma between "first" and "pixel input" should not be there.

Signed and Sealed this

First Day of August, 2006

JON W. DUDAS
*Director of the United States Patent and Trademark Office*